United States Patent [19]

Hope et al.

[11] 4,233,742

[45] Nov. 18, 1980

[54] APPARATUS FOR AREA MEASUREMENT OF ELONGATED STRIPS

[76] Inventors: Henry F. Hope; Stephen F. Hope, both of 2421 Wyandotte Rd., Willow Grove, Pa. 19090

[21] Appl. No.: 62,971

[22] Filed: Aug. 2, 1979

[51] Int. Cl.³ .............................................. G01B 7/32
[52] U.S. Cl. ................................. 33/123; 33/132 R; 33/141.5
[58] Field of Search ................ 33/123, 124, 121, 129, 33/132, 133, 141.5

[56] References Cited

U.S. PATENT DOCUMENTS

| | | | |
|---|---|---|---|
| 608,538 | 8/1898 | Ayer | 33/124 |
| 674,953 | 5/1901 | Beals | 33/123 |
| 2,360,594 | 10/1944 | Stout et al. | 33/123 |
| 3,717,414 | 2/1973 | Hall et al. | 33/123 |
| 3,732,625 | 5/1973 | Verndoy | 33/141.5 |
| 4,024,645 | 5/1977 | Giles | 33/129 |
| 4,156,970 | 6/1979 | Hope et al. | 33/123 |

Primary Examiner—William D. Martin, Jr.
Attorney, Agent, or Firm—Zachary T. Wobensmith, II; Zachary T. Wobensmith, III

[57] ABSTRACT

Apparatus for area measurement of elongated strips of different widths is described, which strips may be film to be treated, the strip to be measured preferably being initially delivered between driven rolls carried on parallel shafts, the strip passing over a driven roll having grooves at predetermined intervals, small freely rotatable rolls with peripheral projections such as rings thereon being provided which depress the strip into the grooves, the freely rotatable rolls being driven by engagement with the strip, the small rolls engaging actuation rolls having magnets carried therein to activate switches to generate pulses for counting by a counter to give an area indication and for other purposes, or the small rolls directly moving magnets for switch activation. The actuation rolls are preferably counterbalanced to reduce undesired unbalance.

14 Claims, 9 Drawing Figures

4,233,742

APPARATUS FOR AREA MEASUREMENT OF ELONGATED STRIPS

BACKGROUND OF THE INVENTION

1. Field of the Invention

This invention relates to apparatus for measuring area of elongated strip materials.

2. Brief Description of the Prior Art

In our prior U.S. Pat. No. 4,156,970, apparatus for area measurement of elongated strips is disclosed in which a plurality of magnet carrying rolls are provided with which the film to be measured is brought into direct contact by parallel closely spaced rolls the length and width of the strip to be measured directly determining the number of magnet carrying rolls which are rotated. Feed rolls are provided to impel the strips and freely rotatable guide rolls are provided close to the magnet carrying rolls.

Many other area measuring devices have been proposed for area measurement of moving strips but these are cumbersome, relatively complex and are subject to operating difficulties with continuous use.

Problems arise with some types of material, such as film, where the strip is so short or so delicate or fragile that it cannot be carried between feed rolls spaced on either side of the magnet carrying rolls and cannot be relied upon to activate magnet carrying rolls. The present invention represents an improvement in that closely associated with the freely rotatable magnet actuating rolls a driven roll is provided having a plurality of spaced grooves therealong and the magnet operating rolls have peripheral portions extending into the grooves so that strip material contacting these peripheral portions deflects the strip material and actuates the magnet operating rolls as determined by the length and width of the strips.

SUMMARY OF THE INVENTION

In accordance with the invention an area measuring apparatus for elongated strips is provided which comprises initial feed rolls for the strip to be measured for delivery of the strip over a roller having grooves at spaced locations therealong, a shaft parallel to said driven grooved shaft having a plurality of freely rotatable rolls with projections thereon engaging the strip and deflect it into as many grooves as are determined by the length and width of the strip. In one form of the invention the magnet operating rolls engage aligned magnet carrying actuation rolls and drive the magnet carrying rolls in accordance with the length and width of the strip magnetically operated switches being provided for each of the magnet carrying rolls for actuation upon roll revolution to provide pulses for accumulation in a counter for area indication and other purposes. The magnet carrying rolls may each be counterbalanced, and the magnets are disposed to avoid magnetic interference. In another form of the invention the magnet operating rolls themselves contain the magnets.

It is the principal object of the invention to provide area measuring apparatus for elongated strips which may be of varying lengths and widths, and even of exceedingly small and of very delicate material, which is simple in construction, compact and which provides pulses representative of areas in an effective manner for counting an area indication.

It is a further object of the invention to provide area measuring apparatus which can be readily incorporated in continuously operated equipment for strip treatment.

It is a further object of the invention to provide area measuring apparatus in which a driven shaft is provided having spaced grooves with a parallel shaft having freely rotatable rolls with peripheral portions extending into the grooves and directly or indirectly operating activating magnets.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 1:
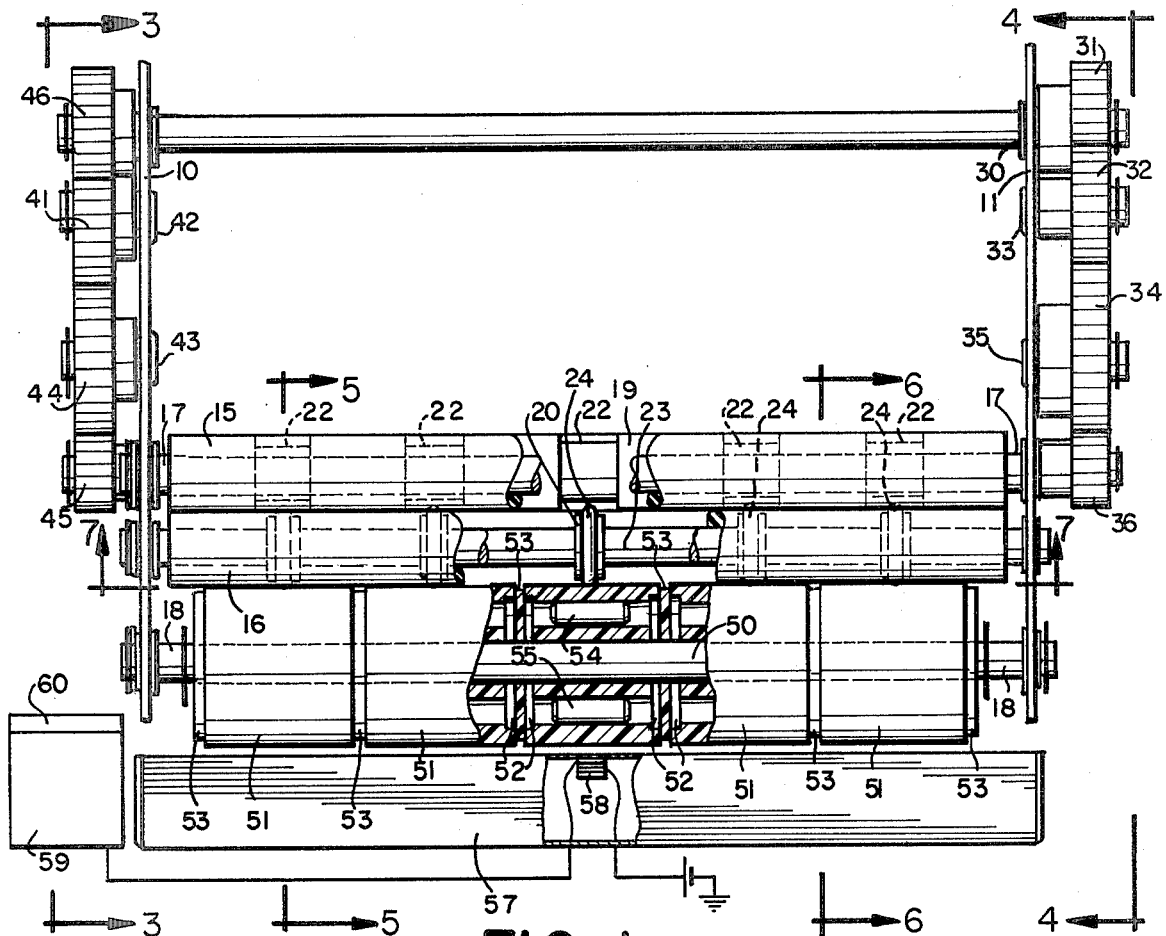
FIG. 1 is a top plan view of area measuring apparatus in accordance with the invention, parts being broken away to show the details of construction.
Figure 2:
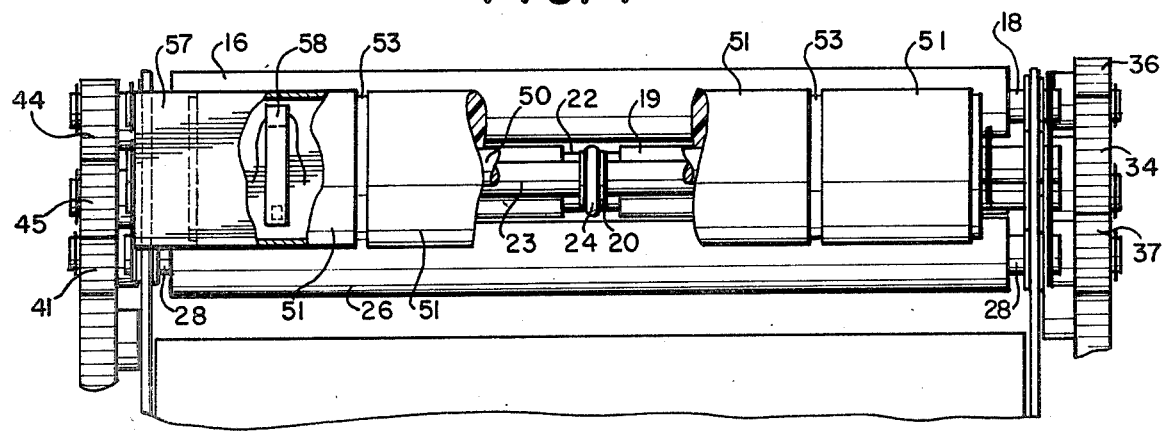
FIG. 2 is a front elevational view of the apparatus of FIG. 1.
Figure 3:
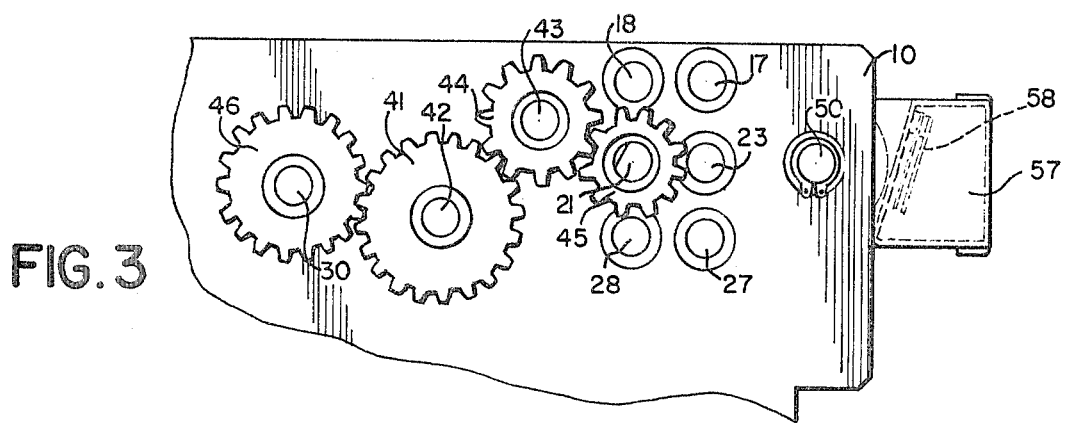
FIG. 3 is a fragmentary vertical sectional view taken approximately on the line 3—3 of FIG. 1.
Figure 4:
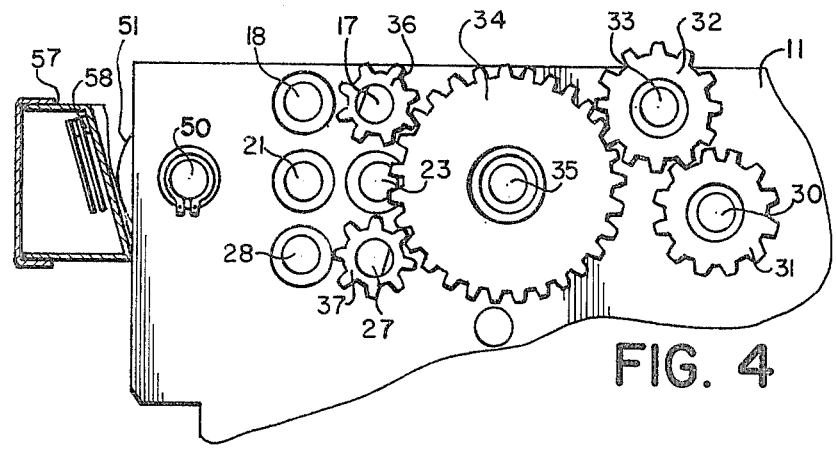
FIG. 4 is a fragmentary vertical sectional view taken approximately on the line 4—4 of FIG. 1.
Figure 5:
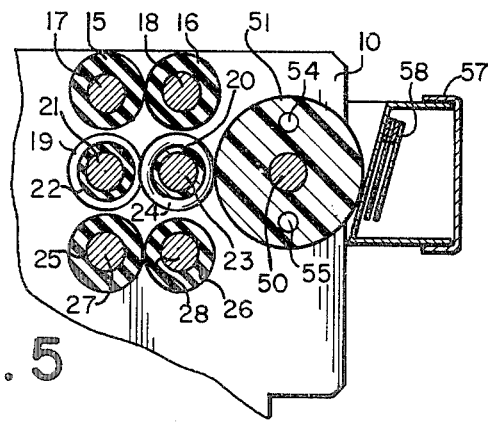
FIG. 5 is a fragmentary vertical sectional view taken approximately on the line 5—5 of FIG. 1.
Figure 6:
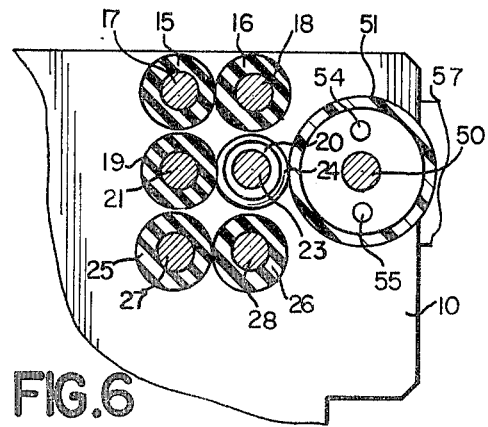
FIG. 6 is a fragmentary vertical sectional view taken approximately on the line 6—6 of FIG. 1.
Figure 7:
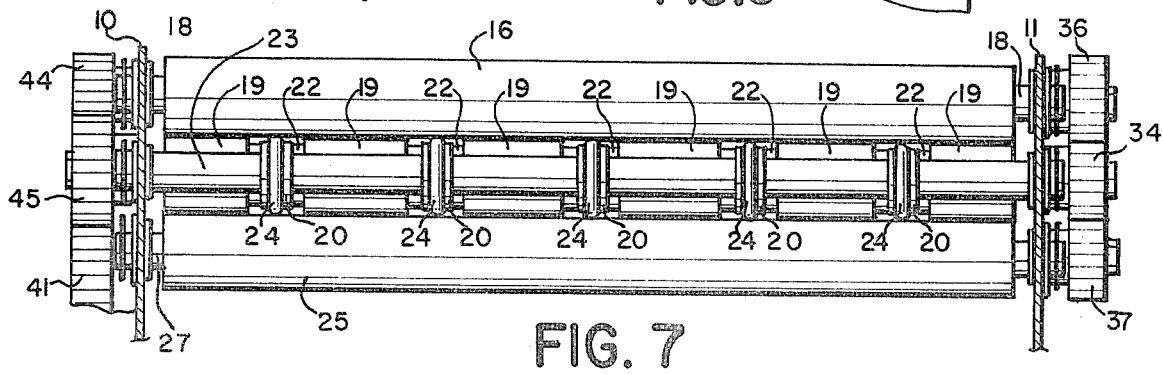
FIG. 7 is a fragmentary vertical sectional view taken approximately on the line 7—7 of FIG. 1.

It should, of course, be understood that the description and drawings herein are illustrative merely and that various modifications and changes can be made in the structure disclosed without departing from the spirit of the invention.

Like numerals refer to like parts throghout the several views.

DESCRIPTION OF A PREFERRED EMBODIMENT

Referring now more particularly to the drawings side frames 10 and 11 are shown of a processing machine to which the elongated strips to be measured are delivered. The processing machine may be, but is not limited to, a film processing machine with a plurality of tanks for successive treatment of the film. The side frames 10 and 11 are held in spaced relation in any desired manner such as by rods or struts .

A pair of rollers 15 and 16 functioning as nip and feed rollers are preferably provided, with their shafts 17 and 18 journaled in the side frames 10 and 11, for receiving and positively delivering the elongated strips to be measured.

Immediately below the rollers 15 and 16 and receiving the strip to be measured a driven roller 19 is provided. The roller 19 is carried on a driven shaft 21 journaled in the side frames 10 and 11. The roller 19 has a plurality of grooves 22 spaced therealong. The rollers 20, are freely rotatable on a fixedly mounted shaft 23 and may have projections or rings 24, such as O-rings, thereon of a diameter to extend slightly into the grooves 22. The fixed shaft 23 is parallel to the shaft 21 and the projections 24 slightly deflect the portions of the strip in contact with the rings 24, and serve for force transfer, as determined by the length and width of the strip.

Immediately below the grooved roller 19 and the shaft 24 with its rollers 20, and receiving the strip therefrom are a pair of driven rollers 25 and 26, carried on shafts 27 and 28 and similar to the rollers 15 and 16, for delivery of the strip for further treatment or for processing.

In order to provide power for roller drive, any desired mechanism can be employed. One suitable driving mechanism is illustrated which includes a primary drive shaft 30 which may be used for driving additional equipment (not shown). The shaft 30 has a gear 31 secured thereto outside the side frame 11 meshing with an idler gear 32 on a stub shaft 33 carried outside the side frame 11. The gear 32 meshes with an idler gear 34 secured on a shaft 35 carried by the side frame 11.

The gear 34 meshes with the drives a gear 36 secured to the shaft 17 and with a gear 37 secured to the shaft 27 in driving relation.

The shaft 30 can extend to and through the opposite frame plate 10, and is journaled therein. The shaft 30, outside the frame 10 has a gear 40 secured thereto which meshes with an idler gear 41 on a stub shaft 42 carried by the frame 10 which meshes with an idler gear 43 on a stub shaft 44 which in turn meshes with and drives a gear 45 secured to the shaft 21 to drive the grooved roller 19.

A shaft 50 is provided, fixedly secured at its ends in the frames 10 and 11, preferably consisting of a metal rod having a plurality of rolls 51, freely rotatable thereon and without any drag of one roll 51 on an adjoining roll 51. The number of rolls 51 will be varied in accordance with the maximum width of the elongated strip to be measured. The rolls 51 can be of any desired material such as synthetic plastic or rubber with dished ends 52 to reduce the end areas for contact. Spacer washers 53 can be interposed between the dished ends 52.

Each of the rolls 51 has carried therein a magnet 54, metal or ceramic, and preferably longitudinally axially disposed between the shaft 50 and the periphery of the roll 51. The magnets 54 are preferably of a length and intensity to avoid any attraction or repulsion of magnets 54 in adjoining rolls 51.

Each of the rolls 51, diametrically opposite to the magnets 54, preferably has a counterweight 56 to balance the weight of the magnet 54 and thereby avoid the application of rotational force on the rolls 51 because of the weight of the magnet 54.

The rolls 51 have the rings 24 on the rollers 20 in engagement therewith so that when the rollers 20 are driven they rotate the rolls 51 as hereafter explained.

A mounting bracket 57 is carried on the machine close to the rolls 51 which has a plurality of individual encapsulated magnetically operated reed switches 58, one for each roll 51, to provide, upon actuation of each switch 58, a pulse for delivery to a pulse counter 59 for summation of pulses from the switches 58 as a measure of the area with a numerical readout 60.

Figure 8:
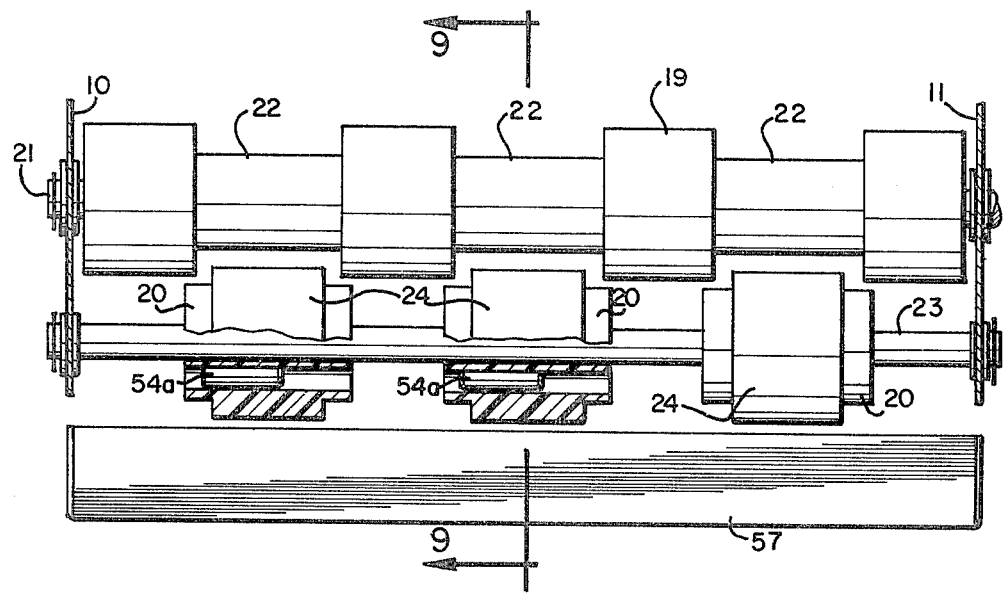
FIG. 8 is a view in perspective of another form of the invention.
Figure 9:
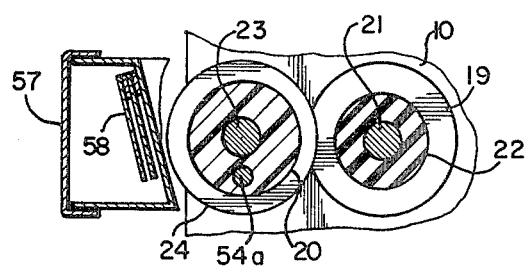
FIG. 9 is a transverse sectional view taken approximately on the line 9—9 of FIG. 8.

In the form of the invention shown in FIGS. 8 and 9 the driven grooved shaft 19 is shown with the fixed shaft 23 parallel thereto, the shaft 23 having freely rotatable rollers 20 thereon, with peripheral projections or rings 24 thereon for strip engagement. In this form of the invention the rollers 20, where they are of a diameter which permits, have the magnets 54a carried thereon for acutation of switches 58.

The mode of operation will not be pointed out.

The elongated strips, the area of which is to be measured may be of the same or different widths, or may be a composite of strips of different widths secured together as a continuous strip or may be individual small pieces.

The strip to be measured is introduced between the rollers 15 and 16, between the roller 19 and one or more of the free wheeling rolls 20, and between the rollers 25 and 26 for further treatment. The rollers 15, 19 and 25 are preferably driven at the same peripheral speed.

As the strip reaches the rollers 19 and 20, depending on its width the strip is depressed slightly by the rings 24 on the roller 20 into the grooves 22 on the roller 19. At the locations of engagement of the strip with the rings 24, these rings 24 serve for force transfer.

In the form of the invention shown in FIGS. 1 to 7, inclusive, the projection 24 on the rollers 20 are in direct contact and in driving relation to the rolls 54 for magnet movement as determined by the length and width of the strips.

In the form of the invention shown in FIGS. 8 and 9 the rollers 20 are directly driven as determined by the length and width of the strip for direct magnet movement.

Rotation of rolls 51 in FIGS. 1 to 7 or rollers 20 in FIGS. 8 and 9 is effective, through the rotary movement of the magnets to actuate the corresponding reed switches 58 to deliver a pulse to the counter 59 for summation with other pulses to give an area measurement.

The measurement may be used to determine the area of the strip being processed as well as for other purposes.

We claim:

1. Apparatus for measurement of area of elongated strips of different width and length which comprises
    width and length sensing means for said strip comprising
        a driven roller for engagement by the strip as determined by its width and length and having a plurality of spaced grooves thereon,
        a shaft fixedly mounted in spaced parallel relation to said driven roller,
        a plurality of spaced roller members freely pivotally mounted on said fixedly mounted shaft and each having a force transfer portion for simultaneous engagement by the strip with said driven shaft member and said spaced roller members as determined by the width and length of the strip,
        each of said force transfer portions extending into one of said grooves for actuation of said roller members upon engagement of a portion of a strip therewith,
    activating members responsive to rotary movement of said roller members as determined by engagement of a strip with said roller members and
    fixedly mounted members responsive to movement of said activating members as determined by the width and length of the strips.

2. The combination defined in claim 1 in which feed roll members are provided for moving the strips in engaging relation to said width and length sensing means.

3. The combination defined in claim 2 in which said feed roll members are in advance of said width sensing means.

4. The combination defined in claim 2 in which said feed roll members are beyond said width sensing means.

5. Apparatus as defined in claim 2 in which
said feed roll members and said driven shaft member are driven at the same peripheral speed.

6. The combination defined in claim 1 in which
said activating members comprise activating portions carried in said spaced roller members.

7. The combination defined in claim 1, in which
an additional fixedly mounted parallel shaft is provided,
said activating members are rotatably carried in freely rotatably rolls on said additional shaft, and
said spaced roller members are in driving relation to said rotatable rolls.

8. The combination defined in claim 1 in which said force transfer portions are friction rings.

9. The combination defined in claim 6 in which said force transfer portions are O-rings.

10. The combination defined in claim 7 in which
said force transfer portions are in driving relation to said rotatable rolls.

11. The combination defined in claim 1 in which
said activating portions are magnets.

12. Apparatus as defined in claim 1 in which
said members responsive to said activating portions are magnetic responsive members.

13. Apparatus as defined in claim 1 in which
said members for pulse delivery are reed switches.

14. Apparatus as defined in claim 1 in which
each of said activating portions is a magnet, and
each of said roll members has a portion for counterbalancing the weight of its magnet.

* * * * *

UNITED STATES PATENT AND TRADEMARK OFFICE
CERTIFICATE OF CORRECTION

PATENT NO. : 4,233,742
DATED : NOVEMBER 18, 1980
INVENTOR(S) : HENRY F. HOPE and STEPHEN F. HOPE It is certified that error appears in the above—identified patent and that said Letters Patent is hereby corrected as shown below:

Column 4,

Line 2, after "for", "acutation" should be - actuation -

Line 3, after "will", "not" should be - now -

Signed and Sealed this

Seventeenth Day of February 1981

[SEAL]

Attest:

Attesting Officer

RENE D. TEGTMEYER

Acting Commissioner of Patents and Trademarks